US009399457B2

(12) United States Patent
Gibson et al.

(10) Patent No.: US 9,399,457 B2
(45) Date of Patent: Jul. 26, 2016

(54) METHODS AND SYSTEMS FOR VEHICLE DRIVELINE TORQUE ESTIMATION

(71) Applicant: Ford Global Technologies, LLC, Dearborn, MI (US)

(72) Inventors: Alex O'Connor Gibson, Ann Arbor, MI (US); Jeffrey Allen Doering, Canton, MI (US); Seung-Hoon Lee, Northville, MI (US); Yuji Fujii, Ann Arbor, MI (US); James William Loch McCallum, Ann Arbor, MI (US); William Russell Goodwin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 346 days.

(21) Appl. No.: 13/970,527

(22) Filed: Aug. 19, 2013

(65) Prior Publication Data
US 2015/0051045 A1 Feb. 19, 2015

(51) Int. Cl.
*B60W 10/06* (2006.01)
*B60W 20/00* (2016.01)
*B60W 10/02* (2006.01)
*F16F 15/131* (2006.01)

(52) U.S. Cl.
CPC .............. *B60W 20/10* (2013.01); *B60W 10/02* (2013.01); *B60W 10/06* (2013.01); *B60W 20/00* (2013.01); *F16F 15/131* (2013.01); *B60W 2422/40* (2013.01); *B60W 2510/1025* (2013.01); *B60W 2710/0666* (2013.01); *B60Y 2400/48* (2013.01); *Y10S 903/902* (2013.01); *Y10T 477/26* (2015.01); *Y10T 477/75* (2015.01)

(58) Field of Classification Search
None
See application file for complete search history.

(56) References Cited

U.S. PATENT DOCUMENTS

| 4,592,241 A  * | 6/1986  | Obayashi .............. G01L 3/1435 73/862.328 |
| 5,726,353 A  * | 3/1998  | Matsuda ................ F16H 59/16 180/338 |
| 5,767,420 A  * | 6/1998  | de Schepper ........... G01L 3/109 73/862.328 |
| 5,983,740 A  * | 11/1999 | Salecker ............... B60W 10/06 477/109 |
| 6,561,949 B2 * | 5/2003  | Janson ................. B60W 10/06 192/21.5 |
| 7,175,555 B2   | 2/2007  | Kozarekar et al. |
| 7,761,224 B2   | 7/2010  | Jones et al. |
| 2006/0161325 A1* | 7/2006 | Jiang ..................... B60W 10/02 701/54 |

* cited by examiner

*Primary Examiner* — Ramya Burgess
*Assistant Examiner* — David Morris
(74) *Attorney, Agent, or Firm* — David Kelley; Alleman Hall McCoy Russell & Tuttle LLP

(57) ABSTRACT

Systems and methods for improving hybrid vehicle torque control are presented. The system and methods included may estimate driveline torque via springs of a dual mass flywheel. The estimated driveline torque may provide feedback for adjusting operation of a driveline disconnect clutch and/or engine torque.

17 Claims, 5 Drawing Sheets

METHODS AND SYSTEMS FOR VEHICLE DRIVELINE TORQUE ESTIMATION

FIELD

The present description relates to a system and methods for estimating driveline torque and using the driveline torque estimate to operate a vehicle. The methods may be particularly useful for hybrid vehicles that include a driveline with a disconnect clutch.

BACKGROUND AND SUMMARY

A hybrid vehicle driveline may include a driveline disconnect clutch. The driveline disconnect clutch may be selectively engaged to couple an engine to a motor and other driveline components. The driveline disconnect clutch may be opened during periods of low driver demand torque so that engine rotation may stop while the motor provides torque to control vehicle motion. At times of higher driver demand torque, the driveline disconnect clutch may be closed so that engine torque may be added to motor torque to provide a desired driver demand torque. However, it may be challenging to provide an accurate estimate of driveline torque produced by the engine to meet the driver demand torque.

For example, an engine torque that is estimated solely based on engine speed and load may not be as accurate as is desired due to varying fuel composition, manufacturing tolerances in engine components, system errors (e.g., cam positioning errors), and other conditions that may affect engine torque. Consequently, errors estimating the driveline torque (e.g., a sum of engine and motor torque) may result in a driver demand torque that is greater than or less than a desired driver demand torque. As a result, transmission shifting, driveline disconnect operation, and capability of providing an accurate driver demand torque may degrade.

The inventors herein have recognized the above-mentioned disadvantages and have developed a method for operating a hybrid driveline, comprising: adjusting engine torque production in response to a torque transferred across a dual mass flywheel, the torque transferred across the dual mass flywheel responsive to an amount of spring deflection within the dual mass flywheel.

By estimating torque transferred across a dual mass flywheel based on spring deflection, it may be possible to provide the technical result of an improved estimate of engine torque. The improved estimate of engine torque may be the basis for making engine torque adjustments so that driveline torque more closely matches driver demand torque. Additionally, an improved estimate of engine torque as determined from a dual mass flywheel may improve transmission shifting, driveline disconnect clutch operation, and operation of other driveline systems or components that rely on engine torque to provide their desired function.

The present description may provide several advantages. Specifically, the approach may improve hybrid driveline operation. For example, transmission shifting may be improved via having an improved engine torque estimate. Further, the approach may improve engine starting via providing an engine torque estimate while the engine is starting. Further still, the approach may allow for improved engine torque control.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
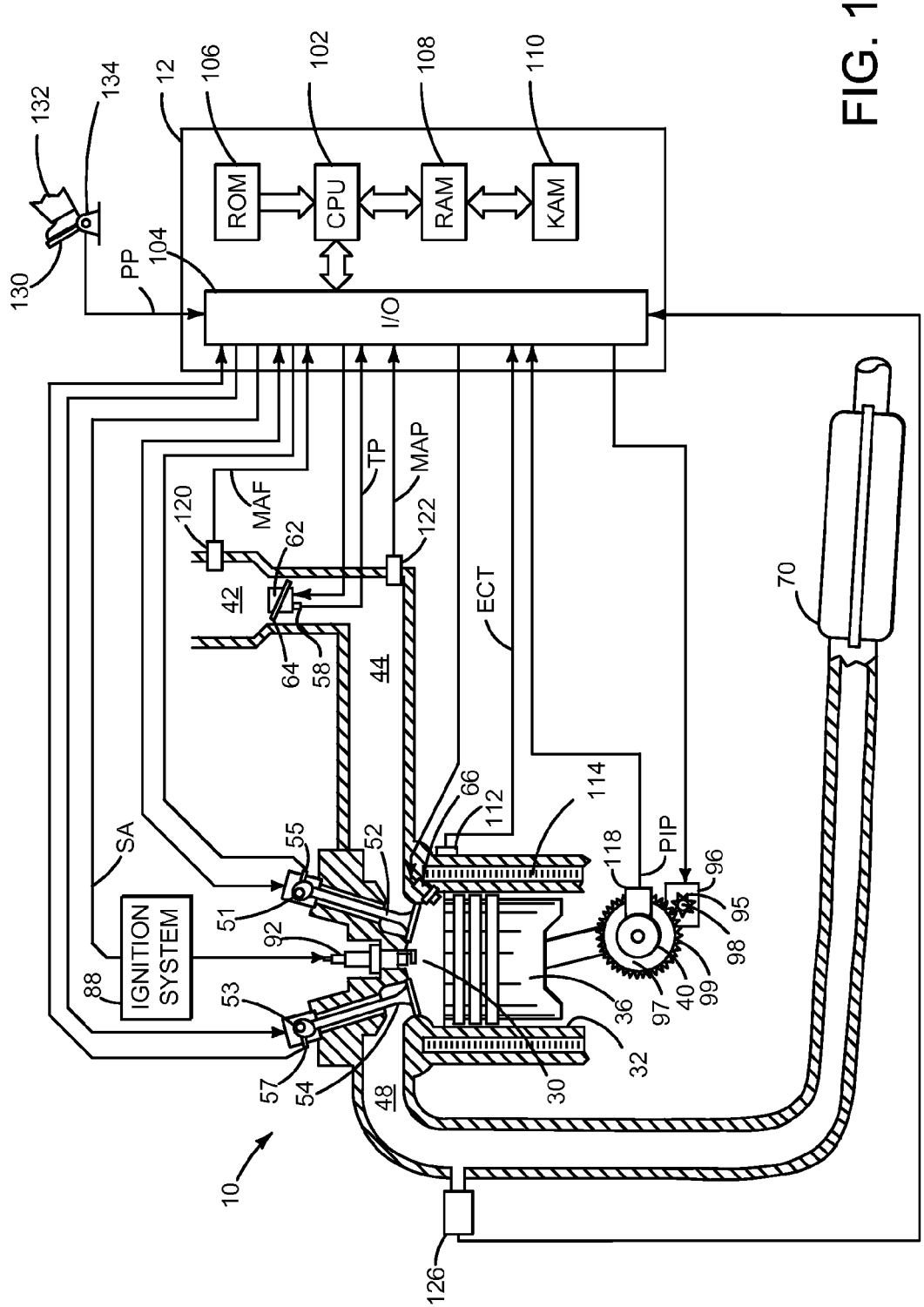
FIG. 1 is a schematic diagram of an engine.
Figure 2:
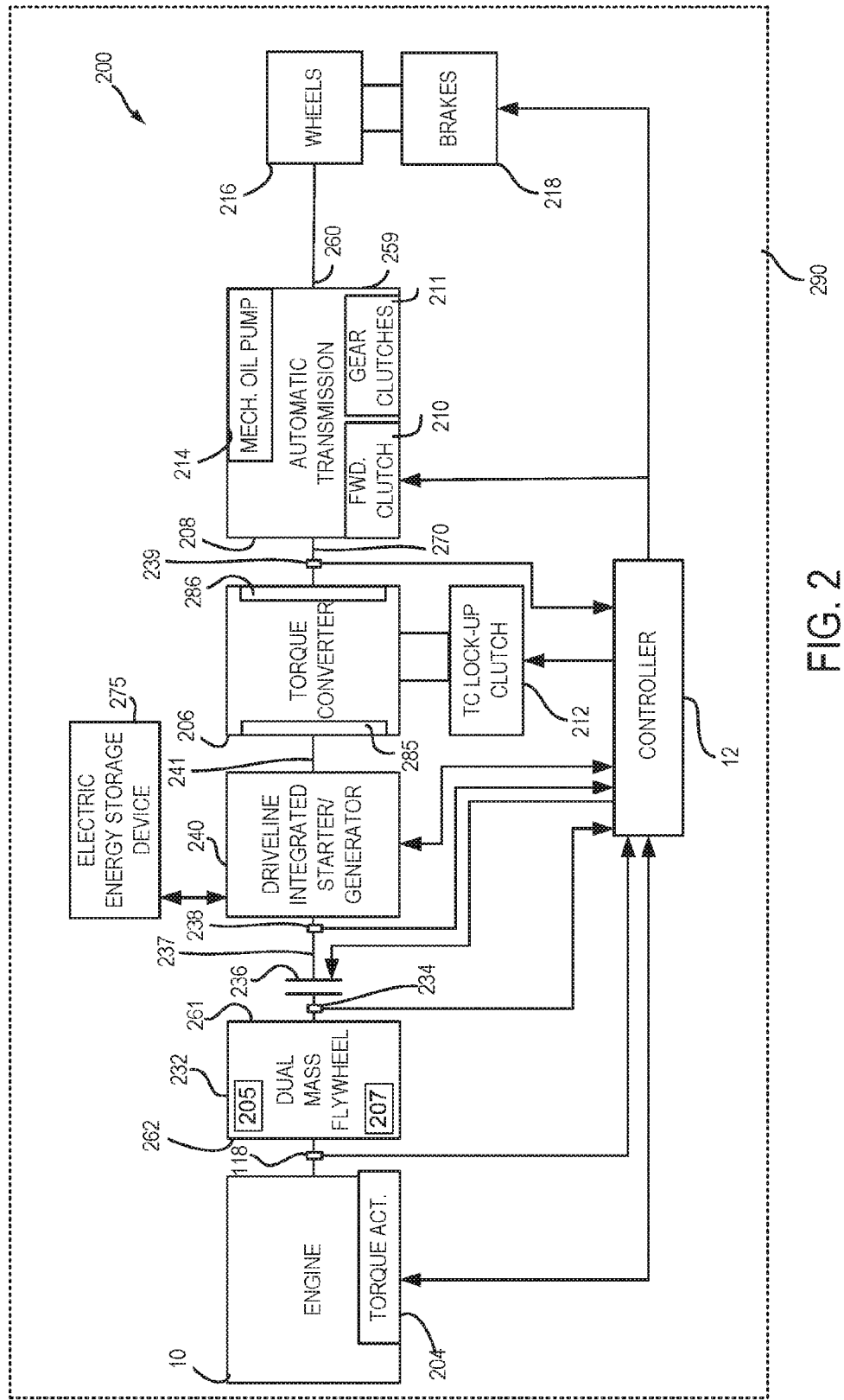
FIG. 2 is shows an example vehicle driveline configuration.
Figure 3:
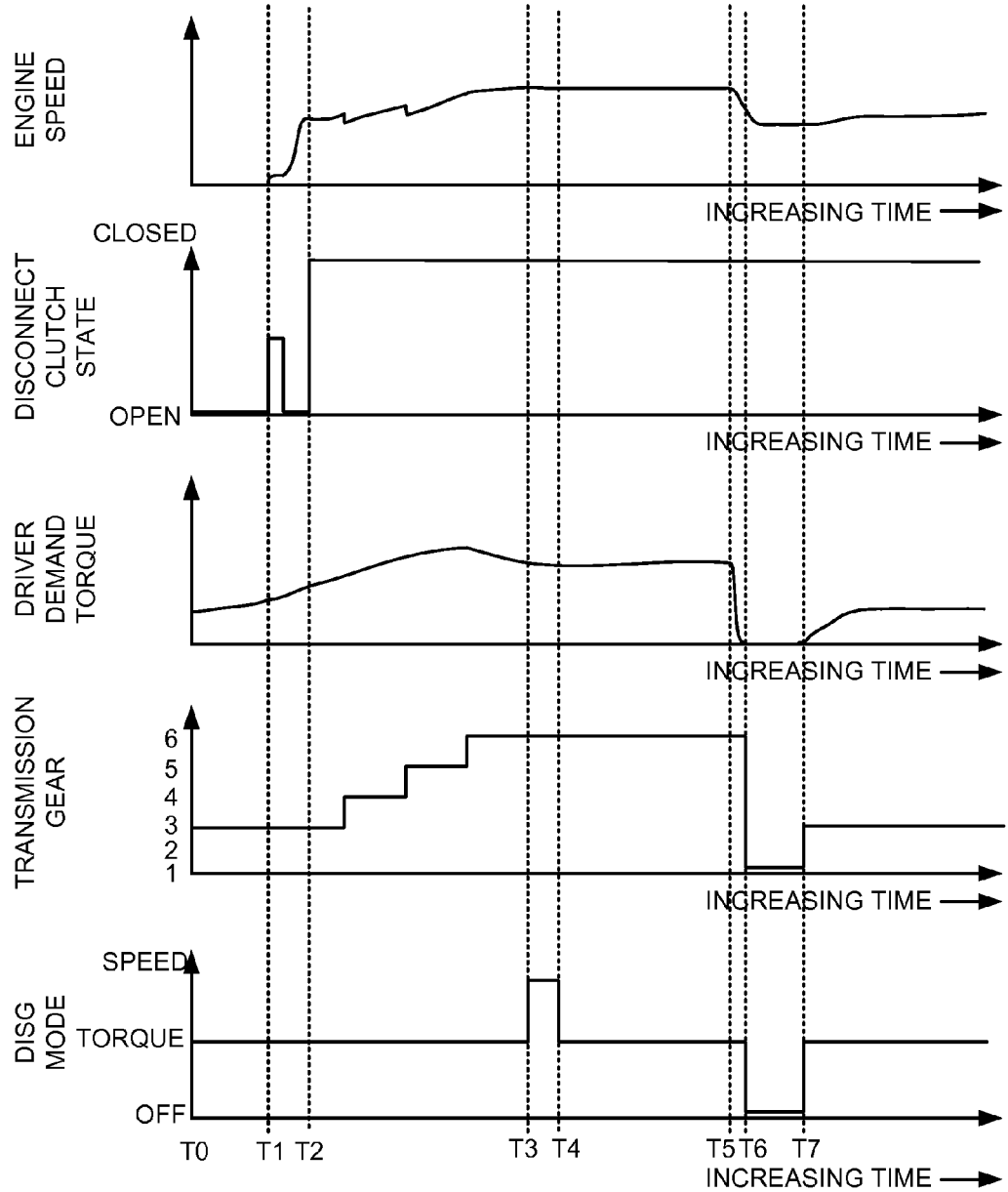
FIG. 3 shows a prophetic vehicle operating sequence.

The present description is related to controlling driveline operation for a hybrid vehicle. The hybrid vehicle may include an engine and a driveline integrated starter/generator (DISG) or electric machine (e.g., motor/generator) as shown in FIGS. 1-2. The engine may be operated with or without the DISG during vehicle operation via a driveline disconnect clutch. The DISG is integrated into the driveline on the same axis as the engine crankshaft and rotates whenever a transmission torque converter impeller rotates. Further, the DISG may not be selectively engaged or disengaged from the driveline. Rather, the DISG is an integral part of the driveline. Further still, the DISG may be operated with or without operating the engine. The driveline may be operated as shown in the sequence of FIG. 3 according to the method of FIG. 4. Finally, FIG. 5 shows an example offset position between two position identifying devices.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. A temperature of catalytic converter 70 may be measured or estimated via engine speed, engine load, engine coolant temperature, and spark timing.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of pulses every revolution of the crankshaft from which engine position and speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via a torque actuator 204, such as a fuel injector, throttle, etc.

An engine output torque may be transmitted to an input side 262 of dual mass flywheel 232. Engine speed as well as dual mass flywheel input side position and speed may be determined via engine position sensor 118. Dual mass flywheel (DMF) 232 may include springs 205 and separate masses 207 for dampening driveline torque disturbances. The output side 261 of dual mass flywheel 232 is shown being mechanically coupled to the input side of driveline disconnect clutch 236. The input side 262 of the dual mass flywheel may move relative to the output side 261 of the dual mass flywheel. Springs 205 apply force to limit motion of the output side of the dual mass flywheel (e.g., the disconnect clutch side) relative to the input side of the dual mass flywheel (e.g., the engine side). Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination driveline position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Thus, the system of FIGS. 1 and 2 provides for a hybrid vehicle system, comprising: an engine coupled to a dual mass flywheel; a motor selectively coupled to the engine via a driveline disconnect clutch; and a controller including non-transitory instructions executable to adjust engine torque in response to a torque transferred across the dual mass flywheel, and additional instructions to estimate the torque transferred across the dual mass flywheel based on a position offset between an input side 262 of the dual mass flywheel and an output side 261 of the dual mass flywheel. The hybrid vehicle system includes where the position offset is based on a position indicator on the input side 262 of the dual mass flywheel and a position indicator on the output side 261 of the dual mass flywheel.

In some examples, the hybrid vehicle system further comprises an automatic transmission and additional instructions to shift the automatic transmission into neutral when determining the position offset. The hybrid vehicle system further comprises a driveline integrated starter/generator and additional instructions to operate the driveline integrated starter/generator in a speed control mode when determining the position offset. The hybrid vehicle system includes where the torque transferred across the dual mass flywheel is based on an amount of spring deflection. The hybrid vehicle system further comprises additional instructions to close the driveline disconnect clutch, and where the estimate of torque transferred across the dual mass flywheel is based on the position offset when the driveline disconnect clutch is closed.

Referring now to FIG. 3, an example driveline operating sequence is shown. The sequence of FIG. 3 may be provided via the system of FIGS. 1 and 2 executing instructions stored in non-transitory memory according to the method of FIG. 4. The sequence of FIG. 3 shows vertical markers T0-T7 which indicate particular times of interest during the operating sequence. All plots in FIG. 3 are referenced to the same time scale and occur at the same time.

The first plot from the top of FIG. 3 is a plot of engine speed versus time. In particular, the X axis represents time and time begins at the left side of FIG. 3 and increases to the right side of FIG. 3. The Y axis represents engine speed and engine speed increases in the direction of the Y axis arrow.

The second plot from the top of FIG. 3 is a plot of driveline disconnect clutch state versus time. The X axis represents time and time begins at the left side of FIG. 3 and increases to the right side of FIG. 3. The Y axis represents driveline disconnect clutch state. The driveline disconnect clutch is open when the driveline disconnect state trace is at a lower level. The driveline disconnect clutch is closed when the driveline disconnect clutch state trace is at a higher level.

The third plot from the top of FIG. 3 is a plot of driver demand torque versus time. The X axis represents time and time begins at the left side of FIG. 3 and increases to the right side of FIG. 3. The Y axis represents driver demand torque and driver demand torque increases in the direction of the Y axis arrow. Driver demand torque may be determined from a position of an accelerator pedal and a transfer function that relates accelerator pedal position to driver demand torque.

The fourth plot from the top of FIG. 3 is a plot of transmission gear versus time. The X axis represents time and time begins at the left side of FIG. 3 and increases to the right side of FIG. 3. The Y axis represents transmission gear and the transmission is in the gear number at the left side of the fourth plot when the trace is at the level of the transmission gear number.

The fifth plot from the top of FIG. 3 is a plot of DISG operating mode versus time. The X axis represents time and time begins at the left side of FIG. 3 and increases to the right side of FIG. 3. The Y axis represents DISG operating mode. The DISG may be in a speed control mode, torque control mode, or off. In speed control mode the DISG torque is adjusted to achieve a desired DISG speed. In torque control mode, DISG current is controlled to provide a desired torque. Current flow to the DISG is stopped when the DISG is off.

At time T0, the engine speed is zero indicating that the engine has stopped rotating and is off. The driveline disconnect clutch is in an open state. The driver demand torque is at a lower level and the DISG is in a torque control mode where the DISG provides the desired driver demand torque to a transmission torque converter impeller (not shown). The driver demand torque is determined from a position of an accelerator pedal. The transmission is in second gear. Such operating conditions are indicative of a vehicle traveling at a low speed under power supplied via the DISG while fuel is conserved by leaving the engine in a stopped state.

At time T1, the driver demand torque has increased to a level where the engine is automatically started in response to the driver demand torque. The engine is started via supplying fuel, air, and spark to the engine while the driveline disconnect clutch is partially closed to accelerate the engine to cranking speed via torque provided by the DISG. The engine speed increases in response to closing the driveline disconnect clutch and the transmission remains in second gear. The DISG remains in a torque control mode and DISG torque is increased (not shown) in response to the driveline disconnect clutch transferring torque from the DISG to the engine. Increasing the DISG torque allows the driveline to maintain its present speed.

Between time T1 and time T2, engine speed accelerates up to a speed of the DISG and the driveline disconnect clutch is opened as engine speed increases. The transmission remains in second gear and the DISG remains in torque control mode.

At time T2, the driveline disconnect clutch is closed in response to the engine speed reaching DISG speed. The driver demand torque continues to increase and engine torque is combined with DISG torque to provide the driver demand torque. The DISG remains in torque control mode and engine speed increases as the torque supplied by the engine increases.

Between time T2 and time T3, the engine speed increases and the transmission is shifted to higher gears. The DISG continues to supply torque to the driveline and the driver demand torque increases and then starts lower. The driveline disconnect clutch remains closed.

In this example, an input side position of a dual mass flywheel is determined from a crankshaft position sensor. The output side position of the dual mass flywheel is determined via a position sensor of the DISG. Thus, the output side position of the dual mass flywheel is downstream of the dual mass flywheel and a driveline disconnect clutch. Therefore, each time the driveline disconnect clutch is engaged, a number of driveline rotational degrees between a position marker on the input side 262 of the dual mass flywheel and a position marker on the output side 261 of the dual mass flywheel (e.g., at the DISG) will vary. Therefore, the number of angular degrees, minutes, and/or seconds (e.g., the offset), between the input side dual mass flywheel position marker and the output side dual mass flywheel position marker is determined so that spring deflection of the dual mass fly wheel may be determined.

From time T3 to time T4, an offset between two driveline position indicating devices is determined. In particular, the offset between two driveline position indicating devices is determined as described at 426. The DISG is operated in speed control mode and DISG current is converted into an estimate of DISG torque. The DISG torque in conjunction with an estimate of torque converter torque as determined from torque converter impeller speed, torque converter turbine speed, and a torque converter transfer function is used to determine the angular offset between the two driveline position indicating devices so that deflection of springs in the dual mass flywheel may be accurately determined. If one of the two driveline position indicating devices is positioned downstream of the driveline disconnect clutch, the angular offset between the two driveline position indicating devices is determined each time the driveline disconnect clutch is closed because the offset moves depending on where the driveline disconnect clutch reaches a fully closed position. The engine torque may be estimated from the torque transferred across the dual mass flywheel after time T4.

At time T5, the driver demand torque is reduced in response to a driver releasing an applied accelerator pedal (not shown). The engine speed is at an elevated level and the driveline disconnect clutch is in a closed state. The transmission is in sixth gear and the DISG is in torque mode.

At time T6, the transmission is shifted into neutral in response to the reduction of driver demand torque and vehicle speed (not shown) being greater than a threshold speed. The DISG is transitioned to an off state where no current flows, or alternatively, the DISG may remain operating while being commanded to zero torque or a torque less than a threshold torque (e.g., 0.5 N-m or less). The driveline disconnect clutch remains in a closed or locked state and engine speed is reduced to a desired level. The engine may be operated in a speed control mode where throttle adjustments alter engine torque to provide a desired speed. Additionally, a torque converter clutch is locked (not shown) in response to the reduction in driver demand torque.

Shifting the transmission into neutral and commanding the DISG to zero torque allows torque delivered across the dual mass flywheel to approach zero (e.g., within ±0.5 N-m of zero). When torque across the dual mass flywheel is approximately zero the dual mass flywheel springs are not compressed so that an angular distance between two driveline position indicating devices on opposite sides of the DMF may be determined. The angular distance between the two driveline position indicating devices may be determined as described at 414 of the method of FIG. 4.

At time T7, the driver demand torque increases in response to a driver applying an accelerator pedal (not shown). The transmission is shifted into third gear and the DISG is transitioned back to torque mode. The engine and the DISG provide a portion of the driver demand torque to the driveline and the driveline disconnect clutch remains closed. The offset determined between time T6 and time T7 may replace or be averaged with the offset determined between time T3 and time T4 after time T7 to determine engine torque from dual mass flywheel spring deflection.

Thus, engine torque may be determined from a driveline offset determined when driveline torque is being provided to vehicle wheels (e.g., time T3-T4) or during conditions of low driver demand torque when fuel cut-off may otherwise be provided except for a desire to determine the driveline offset between two driveline position indicating devices.

Figure 4:
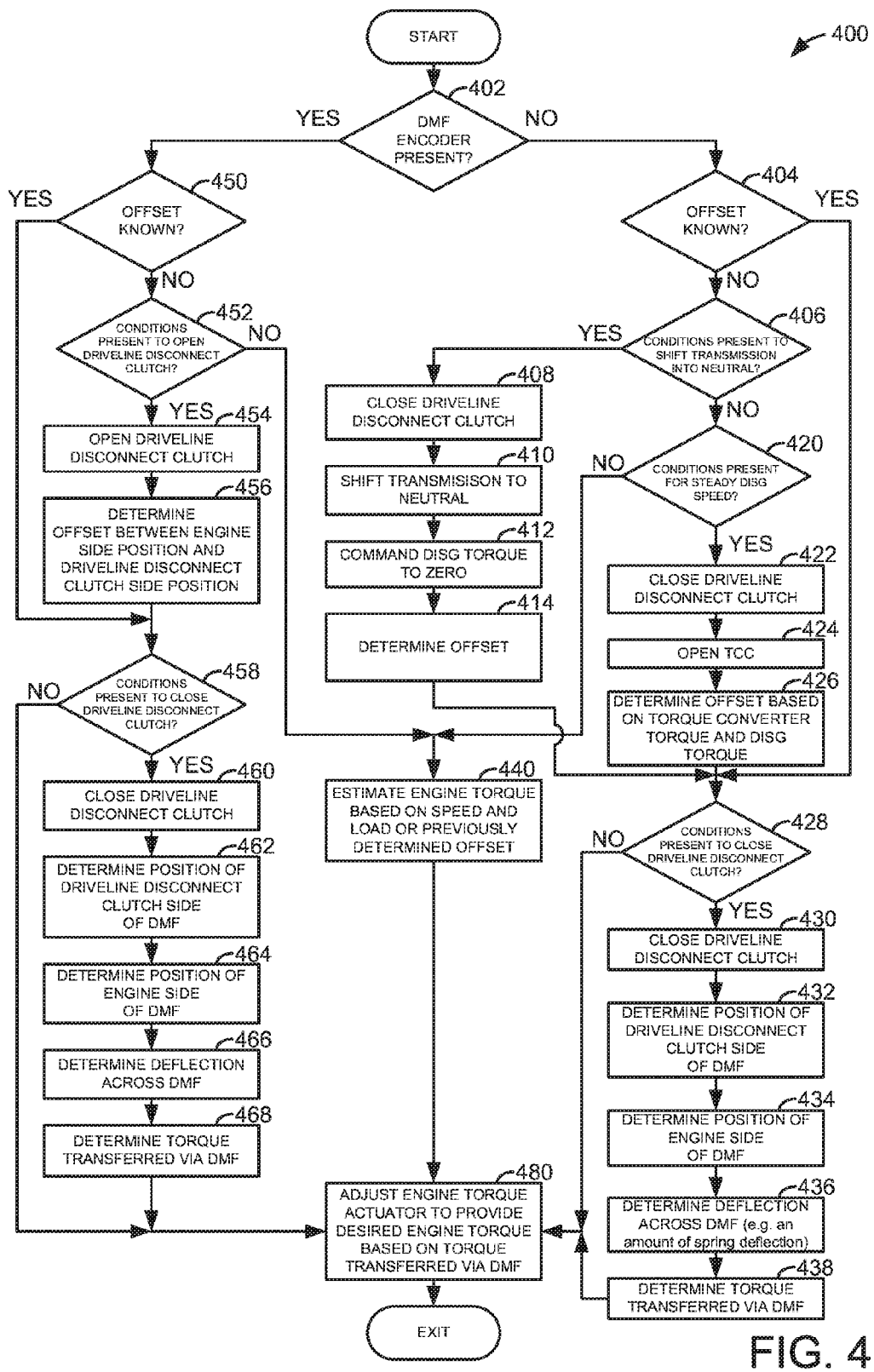
FIG. 4 is a flowchart showing one example method for operating a driveline.
Figure 5:
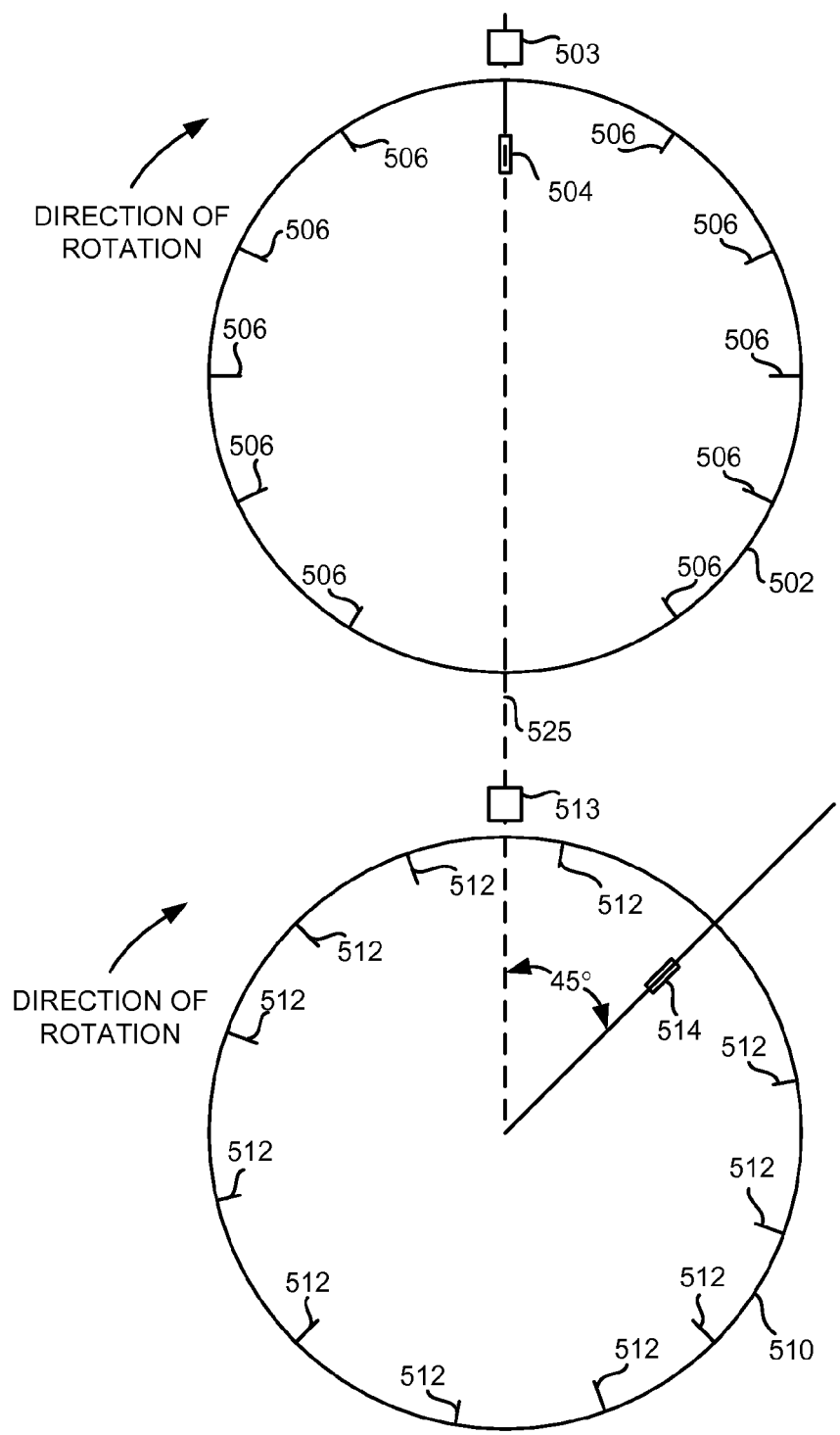
FIG. 5 shows an example offset between two position identifying devices.

Referring now to FIG. 4, a method for operating an engine and driveline of a hybrid vehicle is shown. The method of FIG. 4 may be stored as executable instructions in non-transitory memory of a controller such as controller 12 in FIG. 1. Thus, the method of FIG. 4 may be incorporated in to a system as shown in FIGS. 1 and 2. The method of FIG. 4 may also provide the sequence shown in FIG. 3.

At 402, method 400 judges whether or not a dual mass flywheel (DMF) encoder is present. The DMF encoder may be an optical encoder, a gear tooth device, or other type of driveline rotational position sensor. The DMF encoder is a driveline rotational position indicating device located in a hybrid driveline between a DMF and a driveline disconnect clutch (e.g., 234 of FIG. 2). In one example, method 400 judges whether or not a DMF encoder is present in response to a state of a variable in controller memory that indicates driveline hardware configuration. If method 400 judges that the DMF is present the answer is yes and method 400 proceeds to 450. Otherwise, the answer is no and method 400 proceeds to 404.

At 404, method 400 judges whether or not an offset between two driveline position indicating devices is known or not. In one example, the first driveline position indicating device may be an engine crankshaft position sensor. The second driveline position indicating device may be located downstream of a driveline disconnect clutch. For example, the second driveline position indicating device may be a DISG position sensor (e.g., 238 of FIG. 2). If the offset between the two driveline position indicating devices is known, the answer is yes and method 400 proceeds to 428. Otherwise, the answer is no and method 400 proceeds to 406.

An example of an offset between two driveline position indicating devices is shown in FIG. 5. Position indicating wheel 502 is part of crankshaft position sensor 118. In one example, position indicating wheel 502 is coupled to engine crankshaft 40. Position indicating wheel 502 includes a plurality of position indicators 506 that are located around the periphery of indicating wheel 502. Position indicating wheel 502 also includes an index indicator 504 that when combined with position indicators 506 enables determination of crankshaft position. Alternatively, one or more position indicators 506 may be omitted to define a specific index position.

In some examples, index indicator 504 may be aligned with cylinder number one top-dead-center compression stroke/top-dead-center exhaust stroke or some other selected engine position so that engine crankshaft position may be determined relative to the engine cycle (e.g., four strokes for a four stroke engine). Since the crankshaft is part of the driveline, the position indicating wheel 502 indicates a position of the driveline. Position of only one of position indicators 506 is detected at a time; however, index indicator 504 may be detected at a same time as a position indicator. Vertical marker 525 shows the axis along which detector 503 senses position indicators 506 and index indicator. Thus, at the present position of position indicating wheel 502, one position indicator 506 and index indicator 504 are detected.

Position indicating wheel 510 is also part of a second driveline position sensing device. In one example, position indicating wheel 510 may be part of DMF position sensor 234 which is located upstream of driveline disconnect clutch 236. Position indicating wheel 510 may be mechanically coupled to DMF 232. In other examples, position indicating wheel 510 may be part of torque converter impeller position sensor 238 or another driveline position sensor.

Position indicating wheel 510 includes a plurality of position indicators 512 that are located around the periphery of indicating wheel 510. Position indicating wheel also includes an index indicator 514 that when combined with position indicators 512 enables determination of driveline position. Position of only one of position indicators 512 is detected at a time; however, index indicator 514 may be detected at a same time as a position indicator. Vertical marker 525 shows the axis along which detector 513 senses position indicators 506 and index indicator. Thus, at the present position of position indicating wheel 502, one position indicator 506 is detected and index indicator 514 is not detected.

Index indicator 514 may be referenced to index indicator 504 of position indicating wheel 502, which is located in the driveline upstream of index indicator 514, to determine a position of the driveline relative to index indicator 504. For example, if position indicating wheel 510 is coupled to DMF 232 an offset may be determined by establishing a rotational angular distance between index indicators 504 and 514. If the two index indicators are aligned, the offset is zero. However, manufacturing tolerances may increase the offset to more than a few degrees. If position indicating wheel 510 is coupled to the DISG downstream of the driveline disconnect clutch, the offset varies depending on where the driveline disconnect clutch is fully engaged. In this example index indicator 514 is 45° advanced of index indicator 504. Thus, the offset is 45° in this example. Consequently, if an angular distance of 47° is shown between index indicator 514 and index indicator 504, the angular distance due to DMF spring deflection is 2° since the offset is 45°. When the driveline rotates and the driveline disconnect clutch is closed, each of position indicating wheels 502 and 510 rotate in the direction shown at the same rate of rotation.

Returning now to FIG. 4, at 406, method 400 judges whether or not conditions are present to automatically shift the transmission from a forward gear to neutral. In one example, the transmission may be shifted to neutral when driver demand torque is less than a threshold driver demand torque and when vehicle speed is greater than a threshold vehicle speed. Further, in one example, instead of entering a deceleration fuel cut-off mode, the transmission is shifted to neutral. If method 400 judges conditions are present to shift the transmission to neutral, the answer is yes and method 400 proceeds to 408. Otherwise, the answer is no and method 400 proceeds to 420.

At 408, method 400 closes the driveline disconnect clutch. The driveline disconnect clutch is closed because one driveline encoder is located downstream of the driveline disconnect clutch and the offset may only be reliably determined when the driveline disconnect clutch is closed. Method 400 proceeds to 410 after the driveline disconnect clutch is closed.

At 410, method 400 shifts the transmission to neutral from a forward gear. The transmission is shifted to neutral via reducing pressure in circuits supplying transmission fluid to transmission gears. Further, the transmission torque converter clutch may be is locked or closed in a controlled manner to reduce any oscillations in the engine crankshaft, DMF, driveline disconnect clutch, and/or DISG system after the transmission is shifted to Neutral. By using the torque converter clutch and/or the DISG to damp out any oscillations in the crankshaft to torque converter system, any delay in obtaining a consistent reading from the encoder may be reduced. The transmission is shifted to neutral so that the driveline is allowed to freewheel without being constrained on one side of the driveline. This reduces the possibility of torque developing across the DMF. Method 400 proceeds to 412 after the transmission is shifted to neutral.

At 412, method 400 commands the DISG to zero torque. In one example, current flow to the DISG may be stopped. In other examples, the DISG may be commanded to zero torque and DISG current is adjusted so that the DISG provides zero torque. By commanding zero torque at the DISG, substantially zero torque (e.g., less than ±2 N-m) is developed between the engine and the DISG across the DMF and the driveline disconnect clutch. Consequently, any spring deflection in the DMF is small. Method 400 proceeds to 414 after DISG torque is commanded to zero.

At 414, the driveline offset is determined. In one example, controller 12 waits to determine a known position of the engine. For example, controller 12 waits until index indicator 504 is detected, and then, position indicators of a position indicating wheel are counted until an index indicator 514 of a second position indicating wheel is detected. The counted number of indicators provides the driveline offset. For example, if the position indicators are spaced one for each crankshaft degree of rotation and 45 position indicators are counted between the index indicator 504 and the index indicator 514, the offset is 45 degrees. In other examples, index indicator 514 may be detected and then the number of position indicators are counted until index indicator 504 is detected. Where no DMF position sensor is present and the second position sensor is located in the driveline downstream of the driveline disconnect clutch, the offset is determined each time the driveline disconnect clutch closes. Method 400 proceeds to 428.

At 420, method 400 judges whether or not conditions are present for operating the DISG at a steady speed. In one example, the DISG may be operated at a steady speed when the driver demand torque is varying by less than a threshold amount. The DISG is operated in speed control mode when the DISG is commanded to a steady speed. By operating the DISG in speed control mode at a steady speed, DISG torque may be determined via DISG current so that the driveline offset may be determined. If method 400 judges that conditions are present for operating the DISG at a steady speed, the answer is yes and method 400 proceeds to 422. Otherwise, the answer is no and method 400 proceeds to 440. Additionally, in some examples, driver demand torque must be greater than a threshold torque for method 400 to proceed to 422.

At 440, method 400 estimates engine torque based on engine speed and load. Alternatively, if the driveline offset has already been determined, engine torque is determined based on the offset and DMF spring deflection.

If the driveline offset has not been determined, engine torque is estimated based on engine speed and load. Load may be expressed as inducted engine air mass divided by theoretical inducted engine air mass. Engine speed and load are indexes into a table or function in which empirically determined engine torques are stored. The table or function outputs engine torque for the present engine speed and load.

If the driveline offset has been determined, the driveline offset is subtracted from a difference between a position of the first driveline encoder (e.g., engine crankshaft sensor) and a position of the second driveline encoder (e.g., a DMF position sensor or a DISG position sensor) and the remainder represents spring deflection in degrees, minutes, seconds. The spring deflection is used to index a function that expresses torque across the DMF as a function of spring deflection. The spring deflection is the angular movement in degrees, minutes, seconds between the input side 262 of the DMF and the output side of the DMF. The function outputs torque in units of N-m or Ft-lb. Alternatively, the spring deflection may be input to an equation that describes DMF torque. Method 400 proceeds to 480.

At 480, method 400 adjusts engine torque based on a difference between a desired engine torque and engine torque as determined via DMF spring deflection or engine speed and load. In particular, DMF torque based on driveline offset (e.g., DMF torque is an estimate of engine torque) or engine torque determined from engine speed and load is subtracted from desired engine torque. If there is a remainder, an engine torque actuator increases engine output torque when desired engine torque is greater than engine torque as determined via the DMF or engine speed and load. The engine torque actuator reduces engine torque when the engine torque as determined via the DMF or engine speed and load is greater than the desired engine torque. The engine torque actuator may be a throttle, cam phasor, fuel injector, spark timing, or other actuator that affects engine torque. Method 400 exits after engine torque is adjusted.

At 422, method 400 closes the driveline disconnect clutch. The driveline disconnect clutch is closed because one driveline encoder is located downstream of the driveline disconnect clutch and the offset may only be reliably determined when the driveline disconnect clutch is closed. Method 400 proceeds to 424 after the driveline disconnect clutch is closed.

At 424, method 400 opens the torque converter bypass clutch. By opening the torque converter bypass clutch, all torque transferred through the torque converter is transferred via a hydraulic path and not via a friction path (e.g., the torque converter clutch). Therefore, torque transferred through the torque converter may be estimated based on torque converter impeller speed and torque converter turbine speed. Method 400 proceeds to 426 after the torque converter clutch is opened.

At 426, method 400 determines the driveline offset based on torque converter torque and DISG torque. In particular, the offset is based on the following equation:

$$\text{offset} = \frac{(Tor_{isg} - Tor_{Tc})}{K_{DMF}} - (\Theta_{cs} - \Theta_{re})$$

Where offset is the driveline offset, $Tor_{isg}$ is DISG torque, $Tor_{Tc}$ is torque converter torque, $K_{DMF}$ is DMF spring stiffness, and $(\Theta_{cs}-\Theta_{re})$ is difference between the location of the engine crankshaft index indicator and the driveline index (e.g., DMF or DISG) indicator. DISG torque is determined from DISG current. The DISG current is input to a table or function that holds empirically determined values of DISG torque based on DISG speed and current. The torque converter torque is determined via a function or table that describes torque transferred via a torque converter based on torque converter impeller speed and torque converter turbine speed. The DMF spring stiffness factor K is a table or function that holds empirically determined values of DMF spring stiffness. In this way, the driveline offset may be determined when the transmission may not be operated in neutral. Method 400 proceeds to 428 after the offset is determined.

At 428, method 400 judges whether or not conditions are present to close the driveline disconnect clutch. The driveline disconnect clutch may be closed when battery state of charge (SOC) is less than a threshold amount, when engine braking is desired, or when driver demand torque is greater than a threshold amount. If method 400 judges that conditions are present to close the driveline disconnect clutch, the answer is yes and method 400 proceeds to 430. Otherwise, the answer is no and method 400 proceeds to 480.

At 430, method 400 closes the driveline disconnect clutch. The driveline disconnect clutch may be electrically or hydraulically closed. Method 400 proceeds to 432 after the driveline disconnect clutch is closed.

At 432, method 400 determines a position of a driveline disconnect clutch side of the DMF. The position of the driveline disconnect clutch side of the DMF may be determined via locating an index indicator of a position indicating wheel as the position indicating wheel rotates with the driveline. The index indicator may be a missing tooth of a gear wheel or it may be an indicator separate from the position indicators as shown in FIG. 5. The index indicator on the driveline disconnect clutch side of the DMF may be aligned with a specific DISG position or torque converter turbine position. However, the index indicator does not have to be aligned with any particular driveline position downstream of the driveline disconnect clutch. Method 400 proceeds to 434 after the position of the driveline disconnect side of the DMF is determined.

At 434, method 400 determines a position of the engine side of the DMF. The position of the engine side of the DMF may be determined via locating an index indicator of a position indicating wheel as the position indicating wheel rotates with the engine. The index indicator may be a missing tooth of a gear wheel or it may be an indicator separate from the position indicators as shown in FIG. 5. The index indicator on the engine side of the DMF may be aligned with a specific engine position such as cylinder number one top-dead-center compression stroke. Method 400 proceeds to 436 after the position of the engine side of the DMF is determined.

At 436, method 400 determines the spring deflection of the DMF. In one example, the spring deflection is the number of driveline degrees of rotation between the index indicator on the engine side of the DMF and the index indicator on the disconnect clutch side of the DMF minus the offset determined at 414 or 426. In some examples, the offset determined at 414 and the offset determined at 426 are averaged to determine the offset used at 436. In still other examples, the offset determined at 426 may be replaced by the offset determined at 414 to improve the engine torque estimate. Thus, if the offset is zero, the spring deflection of the DMF in degrees, minutes, and seconds the number of driveline degrees between the index indicator on the engine side of the DMF and the index indicator on the driveline side of the DMF. Method 400 proceeds to 438 after the DMF spring deflection is determined.

At 438, method 400 determines the torque transferred through the DMF. The torque transferred thorough the DMF represents engine torque based on the driveline layout. DMF torque is determined via indexing a function or table that holds empirically determined values of torque transferred across the DMF based on DMF spring deflection or relative motion between the input side 262 of the DMF and the output side 261 of the DMF. The function or table is indexed using the spring deflection determined at 436 and the DMF torque is output. Method 200 proceeds to 480 after DMF torque is determined.

At 450, method 400 judges whether or not an offset between two driveline position indicating devices is known or not. In one example, the first driveline position indicating device may be an engine crankshaft position sensor. The second driveline position indicating device may be located at the DMF on the driveline disconnect clutch side. For example, the second driveline position indicating device may be a DISG position sensor (e.g., 234 of FIG. 2). If the offset between the two driveline position indicating devices is known, the answer is yes and method 400 proceeds to 458. Otherwise, the answer is no and method 400 proceeds to 452.

At 452, method 400 judges whether or not conditions are present to open the driveline disconnect clutch. The driveline disconnect clutch may be opened when driver demand torque is less than a threshold driver demand torque and when battery SOC is greater than a threshold SOC. If method 400 judges conditions are present to open the driveline disconnect clutch, the answer is yes and method 400 proceeds to 454. Otherwise, the answer is no and method 400 proceeds to 458.

At 454, method 400 opens the driveline disconnect clutch. Opening the driveline disconnect clutch ensures that engine torque is not transferred to the driveline below the driveline disconnect or vise-versa. Consequently, any driveline torque across the DMF is reduced. Method 400 proceeds to 456 after the driveline disconnect clutch is opened.

At 456, method 400 determines a driveline offset between the engine side of the DMF and the driveline disconnect clutch side of the DMF. Small position differences may arise between an index on the engine side of the DMF and an index on the driveline disconnect side of the DMF due to manufacturing tolerances.

In one example, controller 12 waits to determine a known position of the engine. For example, controller 12 waits until index indicator 504 is detected and then position indicators of a position indicating wheel are counted until an index indicator 514 of a second position indicating wheel is detected. The counted number of indicators provides the offset. For example, if the position indicators are spaced one for each crankshaft degree of rotation and 1 position indicator is counted between the index indicator 504 and the index indicator 514, the offset is 1 degree. In other examples, index indicator 514 may be detected and then the number of position indicators are counted until index indicator 504 is detected. Method 400 proceeds to 458 after the driveline offset is determined.

At 458, method 400 judges whether or not conditions are present to close the driveline disconnect clutch. The driveline disconnect clutch may be closed when battery state of charge (SOC) is less than a threshold amount, when engine braking is desired, or when driver demand torque is greater than a threshold amount. If method 400 judges that conditions are present to close the driveline disconnect clutch, the answer is yes and method 400 proceeds to 460. Otherwise, the answer is no and method 400 proceeds to 480.

At 460, method 400 closes the driveline disconnect clutch. Closing the driveline disconnect clutch allows engine torque to be transferred to the driveline downstream of the disconnect clutch. Method 400 proceeds to 462 after the driveline disconnect clutch is closed.

At 462, method 400 determines a position of the driveline disconnect clutch side of the DMF. The position of the driveline disconnect side of the DMF may be determined as described at 432. Method 400 proceeds to 464 after the position of the driveline side of the DMF is determined.

At 464, method 400 determines a position of the engine side of the DMF. The position of the engine side of the DMF may be determined as described at 434. Method 400 proceeds to 466 after the position of the engine side of the DMF is determined.

At 466, method 400 determines deflection across the DMF. Method 400 determines deflection across the DMF as is described at 436. Method 400 proceeds to 468 after deflection of the DMF is determined.

At 468, method 400 determines torque transferred via the DMF. Method 400 determines torque transferred via the DMF as is described at 438. Method 400 proceeds to 480 after torque transferred across the DMF is determined.

Thus, the method of FIG. 4 provides for operating a hybrid driveline, comprising: adjusting engine torque production in response to a torque transferred across a dual mass flywheel, the torque transferred across the dual mass flywheel responsive to or based on an amount of spring deflection within the dual mass flywheel. The method includes where the amount of spring deflection within the dual mass flywheel is based on a position of an input side 262 of the dual mass flywheel and a position of an output side 261 of the dual mass flywheel. The method includes where the position of the input side 262 of the dual mass flywheel is based on an engine crankshaft position sensor, and where the position of the output side 261 of the dual mass flywheel is based on a dual mass flywheel position sensor located between the dual mass flywheel and the driveline disconnect clutch.

In some examples, the method includes where an engine torque actuator is adjusted to adjust engine torque production. The method further comprises determining an offset between a first position on an input side 262 of the dual mass flywheel and a second position on an output side 261 of the dual mass flywheel. The method includes where the offset is determined when the driveline disconnect clutch is in an open state. The method includes where the estimate of torque transferred across the driveline disconnect clutch is adjusted for the offset.

The method of FIG. 4 also provides for operating a hybrid driveline, comprising: adjusting engine torque production in response to a torque delivered across a dual mass flywheel, the torque delivered across the dual mass flywheel responsive to spring deflection in the dual mass flywheel and one or a combination of a first offset and a second offset, the first offset established via shifting a transmission of the hybrid driveline into neutral during a first mode, the second offset established via operating the transmission in a forward gear during a second mode. The method further comprises shifting the transmission into neutral in response to a reduction in driver demand torque.

In some examples, the method further comprises commanding a driveline integrated starter/generator to a torque less than a threshold torque while the transmission is in neutral (e.g., zero torque). The method further comprises operating a driveline integrated starter/generator in a speed control mode during the second mode. The method includes where the first offset and the second offset are averaged to estimate the torque transferred across the dual mass flywheel. The method includes where the first offset replaces the second offset to estimate the torque transferred across the dual mass flywheel after the first offset is determined. The method further comprises estimating the first offset via an input side position of a dual mass flywheel and an output side position of the dual mass flywheel, and estimating the second offset via the input side position of the dual mass flywheel and the output side position of the dual mass flywheel.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a hybrid driveline, comprising: adjusting engine torque production in response to a torque transferred across a dual mass flywheel, the torque transferred across the dual mass flywheel responsive to an amount of spring deflection within the dual mass flywheel, where a position of an input side of the dual mass flywheel is based on an engine crankshaft position sensor, and where a position of an output side of the dual mass flywheel is based on a dual mass flywheel position sensor located between the dual mass flywheel and a driveline disconnect clutch on the output side of the dual mass flywheel, and where a transmission of the hybrid driveline is shifted into neutral in response to a driver demand torque less than a threshold driver demand torque and a vehicle speed greater than a threshold vehicle speed.

2. The method of claim 1, where the amount of spring deflection within the dual mass flywheel is based on the position of the input side of the dual mass flywheel and the position of the output side of the dual mass flywheel.

3. The method of claim 1, where an engine torque actuator is adjusted to adjust the engine torque production.

4. The method of claim 1, further comprising determining an offset between a first position on the input side of the dual mass flywheel and a second position on the output side of the dual mass flywheel.

5. The method of claim 4, where the offset is determined when the driveline disconnect clutch is in an open state.

6. The method of claim 5, where an estimate of torque transferred across the driveline disconnect clutch is adjusted for the offset.

7. A method for operating a hybrid driveline, comprising: adjusting engine torque production in response to a torque delivered across a dual mass flywheel, the torque delivered across the dual mass flywheel responsive to spring deflection in the dual mass flywheel and one or a combination of a first offset and a second offset, the first offset established via shifting a transmission of the hybrid driveline into neutral during a first mode, the second offset established via operating the transmission in a forward gear during a second mode, and shifting the transmission into neutral in response to a reduction in driver demand torque.

8. The method of claim 7, further comprising commanding a driveline integrated starter/generator to a torque less than a threshold torque while the transmission is in neutral.

9. The method of claim 7, further comprising operating a driveline integrated starter/generator in a speed control mode during the second mode.

10. The method of claim 9, further comprising estimating the first offset via an input side position of the dual mass flywheel and an output side position of the dual mass flywheel, and estimating the second offset via the input side position of the dual mass flywheel and the output side position of the dual mass flywheel.

11. The method of claim 7, where the first offset and the second offset are averaged to estimate the torque transferred across the dual mass flywheel.

12. The method of claim 7, where the first offset replaces the second offset to estimate the torque transferred across the dual mass flywheel after the first offset is determined.

13. A hybrid vehicle system, comprising:
an engine coupled to a dual mass flywheel;
a motor selectively coupled to the engine via a driveline disconnect clutch;
a controller including non-transitory instructions executable to adjust engine torque in response to a torque transferred across the dual mass flywheel, and additional instructions to estimate the torque transferred across the dual mass flywheel based on a position offset between an input side of the dual mass flywheel and an output side of the dual mass flywheel; and
an automatic transmission and additional instructions to shift the automatic transmission into neutral in response to determining the position offset.

14. The hybrid vehicle system of claim 13, where the position offset is based on a position indicator on the input side of the dual mass flywheel and a position indicator on the output side of the dual mass flywheel.

15. The hybrid vehicle system of claim 13, further comprising a driveline integrated starter/generator and additional instructions to operate the driveline integrated starter/generator in a speed control mode in response to determining the position offset.

16. The hybrid vehicle system of claim 15, where the torque transferred across the dual mass flywheel is based on an amount of spring deflection.

17. The hybrid vehicle system of claim 13, further comprising additional instructions to close the driveline disconnect clutch, and where the estimate of torque transferred across the dual mass flywheel is based on the position offset while the driveline disconnect clutch is closed.

* * * * *